US00RE47939E

(19) United States
(12) Reissued Patent
Willins

(10) Patent Number: US RE47,939 E
(45) Date of Reissued Patent: Apr. 7, 2020

(54) ENERGY EFFICIENT ROAMING OF A MOBILE DEVICE

(71) Applicant: SYMBOL TECHNOLOGIES, LLC, Lincolnshire, IL (US)

(72) Inventor: Bruce A. Willins, East Northport, NY (US)

(73) Assignee: Symbol Technologies, LLC, Holtsville, NY (US)

(21) Appl. No.: 15/794,821

(22) Filed: Oct. 26, 2017

Related U.S. Patent Documents

Reissue of:
(64) Patent No.: 9,179,263
Issued: Nov. 3, 2015
Appl. No.: 13/334,332
Filed: Dec. 22, 2011

(51) Int. Cl.
*H04W 4/02* (2018.01)
*H04W 52/02* (2009.01)
*H04W 8/22* (2009.01)

(52) U.S. Cl.
CPC ..... *H04W 4/027* (2013.01); *H04W 52/028* (2013.01); *H04W 52/0254* (2013.01); *H04W 8/22* (2013.01); *Y02D 70/142* (2018.01); *Y02D 70/144* (2018.01); *Y02D 70/146* (2018.01); *Y02D 70/164* (2018.01)

(58) Field of Classification Search
CPC ..... H04W 48/04
USPC ..... 455/456.4
See application file for complete search history.

(56) References Cited

U.S. PATENT DOCUMENTS 6,233,448 B1 * 5/2001 Alperovich et al. ..... 455/417
6,940,407 B2 * 9/2005 Miranda-Knapp et al. ..... 340/572.1
7,145,454 B2 * 12/2006 Linjama et al. ..... 340/540
9,179,263 B2 11/2015 Willins
2007/0072553 A1 3/2007 Barbera
2007/0082688 A1 4/2007 Tu et al.
2008/0064446 A1 3/2008 Camp et al.
2009/0068970 A1 3/2009 Ahmed et al.
(Continued)

FOREIGN PATENT DOCUMENTS

JP 2010166233 A 7/2010
WO 2010/111399 A1 9/2010

OTHER PUBLICATIONS

International Search Report and Written Opinion for International Patent Application No. PCT/US2012/067900 dated Nov. 14, 2013.

(Continued)

*Primary Examiner* — Nick Corsaro

(57) ABSTRACT

Energy efficient roaming of a mobile device is described. The mobile device can include a sensor for sensing a motion of the mobile device to generate a sensor signal. A radio is capable of communicating with a wireless network. A processor activates the radio in the mobile device. The processor generates an environmental profile of the mobile device based at least on the sensor signal. A memory is coupled to the processor for storing the environmental profile. The processor deactivates the radio when the environmental profile indicates that the rate of motion of the mobile device is above a predetermined threshold for a first period of time. The processor reactivates the deactivated radio when the environmental profile indicates that the rate of motion of the mobile device is below the predetermined threshold for a second period of time.

18 Claims, 3 Drawing Sheets

(56) References Cited

U.S. PATENT DOCUMENTS

| | | | | |
|---|---|---|---|---|
| 2009/0098855 | A1* | 4/2009 | Fernandez et al. | 455/410 |
| 2009/0132197 | A1 | 5/2009 | Rubin et al. | |
| 2009/0215466 | A1* | 8/2009 | Ahl et al. | 455/456.1 |
| 2010/0062788 | A1 | 3/2010 | Nagorniak | |
| 2010/0130213 | A1* | 5/2010 | Vendrow et al. | H04M 3/42374 455/445 |
| 2011/0053506 | A1* | 3/2011 | Lemke et al. | 455/41.2 |
| 2011/0065456 | A1* | 3/2011 | Brennan et al. | 455/456.4 |
| 2011/0111724 | A1* | 5/2011 | Baptiste | 455/404.1 |
| 2011/0171909 | A1* | 7/2011 | Jung et al. | 455/41.2 |
| 2012/0129544 | A1* | 5/2012 | Hodis | G01S 19/34 455/456.1 |
| 2013/0023237 | A1* | 1/2013 | Meredith | H04W 12/06 455/411 |
| 2013/0165103 | A1* | 6/2013 | Ammari | H04W 48/04 455/418 |

OTHER PUBLICATIONS

International Search Report for counterpart International Patent Application No. PCT/US2012/067900 mailed Nov. 14, 2013.
International Search Report and Written Opinion mailed Nov. 14, 2013 in counterpart PCT application PCT/US2012/067900.

* cited by examiner

ENERGY EFFICIENT ROAMING OF A MOBILE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention generally relates to mobile units such as mobile computing devices, cellular phones, personal data assistants (PDAs), and the like, and more particularly relates to efficient roaming of such devices.

BACKGROUND

Mobile devices can be used for a variety of tasks, for example, to send and receive email, access the Internet, and send and receive telephone calls. Many mobile devices can provide Location-Based Services (LBS), such as a mapping application or a navigation application. For example, a mobile device can include a Global Positioning System (GPS) receiver, which can be used for determining the location of the mobile device, and to provide the user with location information.

Mobile devices generally rely on an internal battery for power. Unfortunately, the internal battery has a limited supply of power necessary to operate the mobile device before requiring a recharge. The mobile device includes various software components and/or hardware components which can be power-consuming or resource-consuming. The continuous operation of such components can result in significant consumption of power and/or other resources, which can exhaust the battery of the mobile device.

SUMMARY

In one aspect, the invention is embodied in a method of roaming for a wireless network. The method includes activating a radio in a mobile device. The radio is capable of communicating with a wireless network. A motion of the mobile device is sensed and a sensor signal is generated. An environmental profile of the mobile device is generated based at least on the sensor signal. The radio is deactivated when the environmental profile indicates that a rate of the motion of the mobile device is above a predetermined threshold for a first period of time. The deactivated radio is reactivated when the environmental profile indicates that a rate of the motion of the mobile device is below the predetermined threshold for a second period of time.

In one embodiment, the rate of motion includes a speed of the mobile device. The environmental profile can be stored in a memory of the mobile device. The environmental profile can also include at least one of: a rate of change in orientation of the mobile device, an environmental temperature proximate to the mobile device, humidity proximate to the mobile device, altitude of the mobile device, a user interaction with the mobile device, a time of day, a location of the mobile device, a transmission status of a Bluetooth radio within the mobile device, and a battery charge status of the mobile device.

In one embodiment, the motion is based on at least one of a velocity, acceleration, vibration, rotation, and tilt of the mobile device. The wireless network can include a Wi-Fi network. The method can also include periodically reactivating and deactivating the radio during the first period of time to attempt to communicate with a wireless network. In one embodiment, the first period of time is different than the second period of time. The motion can be sensed using a motion sensor in the mobile device.

The radio can be deactivated when the when the environmental profile indicates that the mobile device is traveling in a vehicle. The sensor signal can be manually overridden to reactivate the radio when the radio is deactivated.

In another aspect, the invention is embodied in a mobile device. The mobile device can include a sensor for sensing a motion of the mobile device to generate a sensor signal. A radio is capable of communicating with a wireless network. A processor activates the radio in the mobile device. The processor generates an environmental profile of the mobile device based at least on the sensor signal. A memory is coupled to the processor for storing the environmental profile. The processor deactivates the radio when the environmental profile indicates that the rate of motion of the mobile device is above a predetermined threshold for a first period of time. The processor reactivates the deactivated radio when the environmental profile indicates that the rate of motion of the mobile device is below the predetermined threshold for a second period of time.

In one embodiment, the rate of motion includes a speed of the mobile device. The motion can be based on at least one of a velocity, acceleration, vibration, rotation, and tilt of the mobile device. The sensor can include an accelerometer and/or a gyroscopic sensor.

The environmental profile can include at least one of: a rate of change in orientation of the mobile device, an environmental temperature proximate to the mobile device, a humidity proximate to the mobile device, an altitude of the mobile device, a user interaction with the mobile device, a time of day, a location of the mobile device, a transmission status of a Bluetooth radio within the mobile device, and a battery charge status of the mobile device.

In one embodiment, the processor can periodically reactivate and deactivate the radio during the first period of time to attempt to communicate with a wireless network. In one embodiment, the first period of time is different than the second period of time. The wireless network can include a Wi-Fi network.

The radio can be deactivated when the environmental profile indicates that the mobile device is traveling in a vehicle. The mobile device can also include a user interface for communicating an instruction to the processor. In one embodiment, the instruction includes manually overriding the sensor signal to reactivate the radio when the radio is deactivated.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

Figure 1:
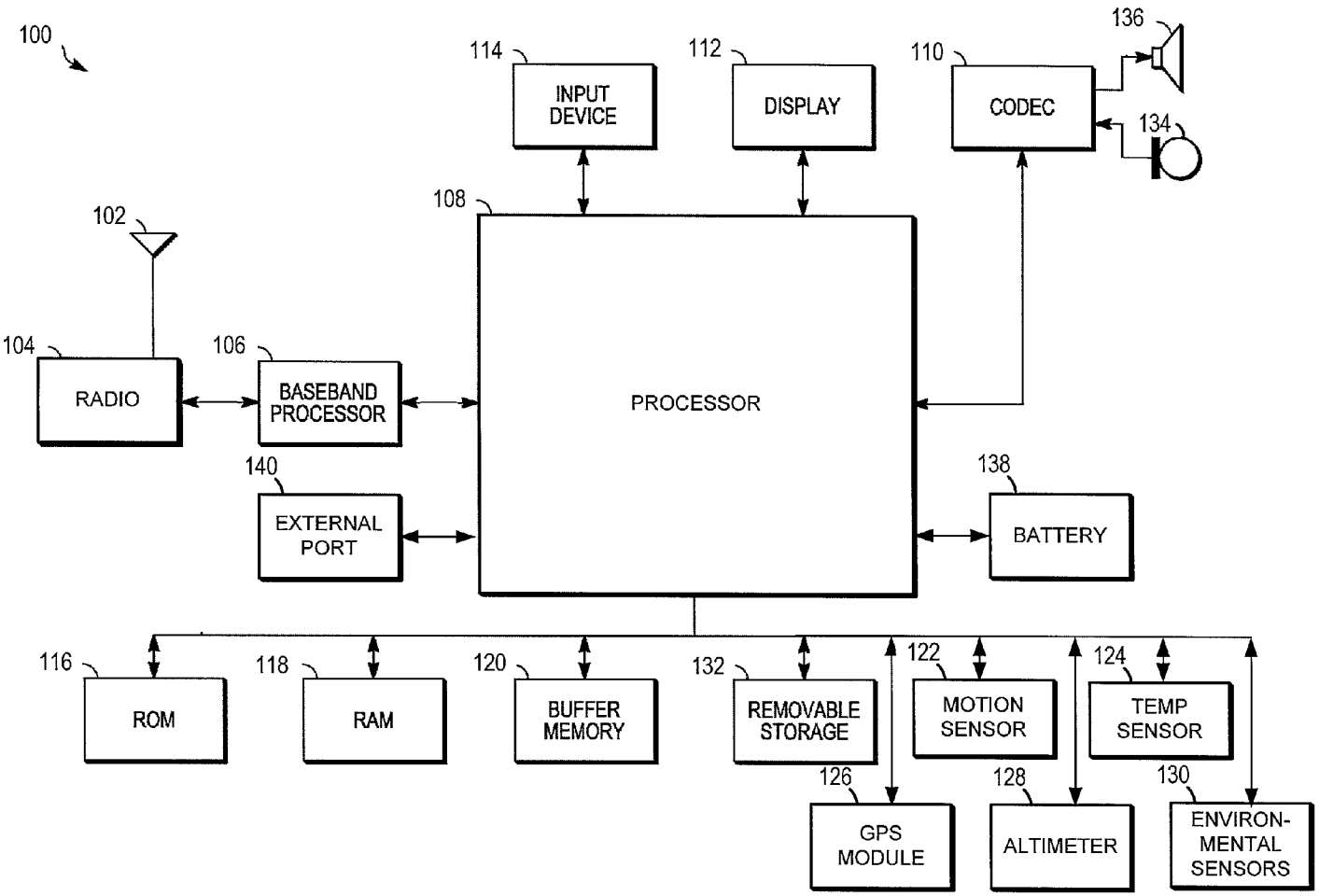
FIG. 1 is a schematic block diagram of a mobile device according to one embodiment of the invention.

The following detailed description is merely illustrative in nature and is not intended to limit the invention or the application and uses of the invention. Furthermore, there is no intention to be bound by any express or implied theory presented in the preceding technical field, background, brief summary or the following detailed description.

For the purposes of conciseness, many conventional techniques and principles related to connecting mobile devices to wireless networks, need not, and are not, described in detail herein. For example, conventional techniques related to signal processing, data transmission, signaling, network control, the 802.11 family of specifications, wireless networks, cellular networks, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Before describing in detail embodiments that are in accordance with the present invention, some of the terms used herein will be defined.

The terms "plurality" or "a plurality" as used herein include, for example, "multiple" or "two or more". For example, "a plurality of items" includes two or more items.

Some embodiments may be used in conjunction with various devices and systems, for example, a mobile computer, a tablet computer, a handheld device, a Personal Digital Assistant (PDA) device, a "smartphone" device, devices and/or networks operating in accordance with existing IEEE 802.11, 802.11a, 802.11b, 802.11g, 802.11n, 802.16, 802.16d, 802.16e, 802.16m standards and/or future versions and/or derivatives of the above standards, units and/or devices which are part of the above networks.

Some embodiments may be used in conjunction with one or more types of wireless communication signals and/or systems, for example, Global Positioning System (GPS), IEEE 802.11 ("Wi-Fi"), IEEE 802.16 ("Wi-Max"), Some embodiments can be used in conjunction with various other devices, systems and/or networks.

The terms "wireless device" or "mobile device" as used herein include, for example, a device capable of wireless communication, a communication device or communication station capable of wireless communication, a mobile phone, a cellular phone, a PDA capable of wireless communication, a handheld device capable of wireless communication, a portable or non-portable device capable of wireless communication, or the like.

The term "user" as used herein includes, for example, a person or entity that owns a computing device or a wireless device; a person or entity that operates or utilizes a computing device or a wireless device; or a person or entity that is otherwise associated with a computing device or a wireless device.

In one aspect, the invention is embodied in mobile devices and methods of efficient roaming of a mobile device based on activating and deactivating a wireless radio in response to environmental profiles. For example, a mobile device includes a motion sensor that can detect an environmental profile related to a motion of the mobile device.

The environmental profile can include information from various sources, such as an accelerometer, GPS data, a temperature sensor, or a clock, for example, and can determine whether or not the mobile device is in motion. The environmental profile can determine whether or not the mobile device is within a moving vehicle or a rapidly-moving vehicle.

If the processor of the mobile device determines (based on the environmental profile) that the mobile device is not in motion, or is in relatively slow motion, the processor can conclude based on the environmental profile that the mobile device might be in range of a Wi-Fi network and activate the wireless radio to roam for a wireless network. If the processor of the mobile device determines (based on the environmental profile) that the mobile device is in motion, or is in relatively rapid motion (e.g., used within a moving vehicle), then the processor can deactivate the wireless radio to reduce power consumption of the mobile device.

FIG. 1 is a block diagram of a mobile device 100 in accordance with an exemplary embodiment of the present invention. The mobile device 100 includes at least one antenna 102, a radio/transceiver 104, a baseband processor 106, a processor 108, a coder/decoder (CODEC) 110, a display 112, input devices 114 (keyboards, touch screens, etc.), a program memory 116, 118 for storing operating instructions that are executed by the processor 108, a buffer memory 120, one or more motion sensors 122, such as accelerometers and/or gyroscopic sensors, a temperature sensor 124, a global positioning system (GPS) module 126, an altimeter 128, and other environmental sensors 130, a removable storage unit 132, a microphone 134 and an earpiece speaker 136 (i.e., a speaker used for listening by a user of the device 100). The various blocks are coupled to one another as illustrated in FIG. 1. In some implementations, the various blocks can communicate with one another via a bus, such as a PCI bus.

The microphone 134 is capable of receiving audio input from the user of the device 100. The received audio may include speech commands, which can trigger voice-activated or voice-operated actions to be performed by device 100.

The display 112 can be, for example, a Liquid Crystal Display (LCD) display unit, a plasma display unit, or other suitable types of displays or screens. In some embodiments, the display 112 can include a touch-screen, such that the display 112 can present output as well as receive touch-based input or multi-touch input.

The radio/transceiver 104 includes, for example, a wired or wireless transceiver, a wired or wireless modem, a wired or wireless Network Interface Card (NIC) or adapter, or other unit suitable for transmitting and/or receiving communication signals, blocks, frames, transmission streams, packets, messages and/or data. In some embodiments, for example, the radio can include a wireless Radio Frequency (RF) transceiver able to transmit and/or receive wireless RF signals, e.g., through one or more antennas 102 or sets of antennas. For example, the transceiver can be implemented using a transmitter, a receiver, a transmitter-receiver, or one or more units able to perform separate or integrated functions of transmitting and/or receiving wireless communication signals.

The antenna 102 can include an internal and/or external antenna, for example, a RF antenna, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals.

The mobile device 100 can optionally include the GPS module 126, which is capable of receiving signals from one or more satellites to determine the spatial location of the mobile device 100.

The mobile device 100 can also include a power source, such as a battery 138. The battery 138 can be a rechargeable power-cell, one or more electro-chemical cells, a lithium ion (Li-ion) battery, a Li-ion polymer battery, a nickel cadmium (NiCd) battery, a nickel metal hydride (NIMH) battery, a nickel hydrogen (NIH2) battery, or the like. The battery can supply power to the components of the mobile device 100, such as the processor 108 and the display 112.

The mobile device can also include an external port 140, such as a universal serial bus (USB) port. The external port 140 can be used to transmit and receive data and/or to charge the battery 138. The mobile device 100 can be an integrated unit containing at least all the elements depicted in FIG. 1, as well as any other elements necessary for the mobile device 100 to perform its particular functions. As will be appreciated by those skilled in the art, various other elements, components and modules can be included depending on the implementation.

The processor 108 controls an overall operation of the mobile device 100. The processor 108 can include one or more microprocessors, microcontrollers, DSPs (digital signal processors), state machines, logic circuitry, or any other device or devices that process information based on operational or programming instructions. Such operational or programming instructions can be, for example, stored in the program memory 116, 118 that may be an IC (integrated circuit) memory chip containing any form of RAM (random access memory) or ROM (read-only memory), a floppy disk, a CD-ROM (compact disk read-only memory), a hard disk drive, a DVD (digital video disc), a flash memory card or any other medium for storing digital information. In one implementation, the Read Only Memory (ROM) 116 stores microcodes of a program for controlling the processor 108 and a variety of reference data, and the Random Access Memory (RAM) 118 is a working memory of the processor 108 and temporarily stores data that is generated during the execution of the program. The buffer memory 120 may be any form of volatile memory, such as RAM, and is used for temporarily storing received information packets. The removable storage 132 stores a variety of updateable data, and can be implemented using Flash RAM.

One of ordinary skill in the art will recognize that when the processor 108 has one or more of its functions performed by a state machine or logic circuitry, the memory 116, 118 containing the corresponding operational instructions may be embedded within the state machine or logic circuitry.

In one embodiment, the processor 108 can determine an environmental profile based on information from the various sensors 122, 124, 126, 128, and 130 in the mobile device 100. For example, an accelerometer (motion sensor 122) and/or a GPS module 126 can provide data to the processor 108 that can indicate that the mobile device 100 is moving rapidly and is likely located inside a moving vehicle. The processor 108 can use that information to disable the radio 104 since it is energy inefficient to roam for a network where no network exists. In one embodiment, based on a motion experienced by the motion sensor 104, the processor 108 can determine that a user of the device 100 is likely walking. The processor 108 can also determine an environment in which the mobile device 100 is being used. For example, the processor 108 can determine, based on data received from the altimeter 128, that the device is likely in a tall building which could be Wi-Fi enabled. In this case, the processor 108 would activate the wireless radio 104 in the mobile device 100.

In one embodiment, a user can override the decision by the processor 108 to activate or deactivate the Wi-Fi radio 104 in the mobile device 100. For example, if the mobile device 100 is rapidly traveling in a train that includes Wi-Fi capability, the processor 108 can deactivate the wireless radio 100 in response to the environmental profile. A user can override the decision by the processor 108 and manually reactivate the radio 104.

In one embodiment, the processor 108 can be programmed to periodically activate the radio 104 and instruct the radio 104 to roam for an available network. If no wireless network is in range, the processor 108 can deactivate the radio 104 to conserve energy.

Figure 2:
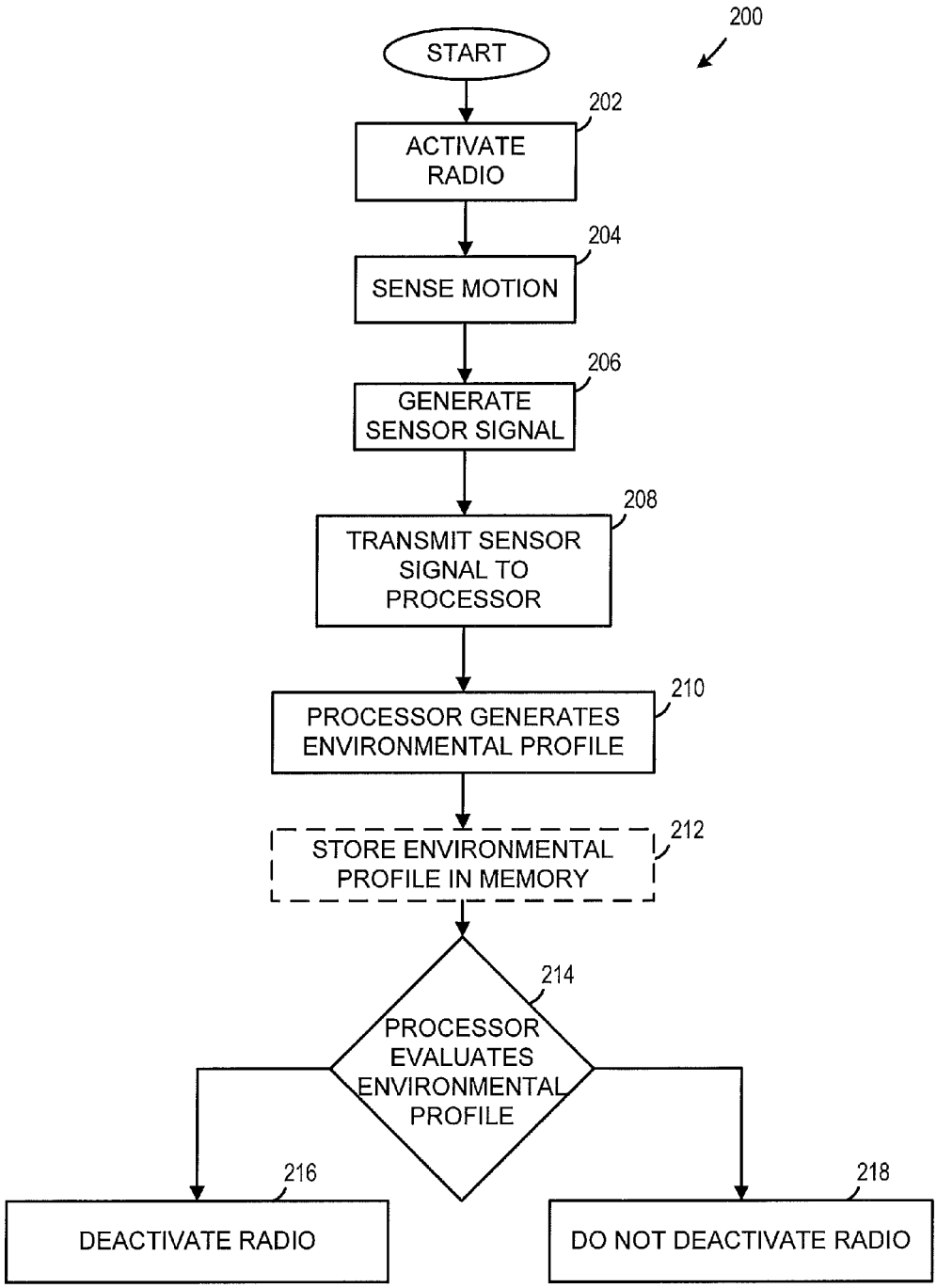
FIG. 2 is a flowchart of a method of efficient roaming for a mobile device according to one embodiment of the invention.

FIG. 2 is a flowchart 200 of a method of efficient roaming for a mobile device 100 according to one embodiment of the invention. The method includes activating the radio 104 (FIG. 1) in the mobile device 100 (step 202). For example, the radio 104 can be a wireless local area network (WLAN) radio. The radio 104 is capable of communicating with a wireless network, such as a Wi-Fi network. In one embodiment, the activated radio 104 can begin roaming to attempt to discover a wireless network that is in range of the mobile device 100.

A motion sensor 122 (FIG. 1) senses a motion of the mobile device 100 and generates a sensor signal (step 206). The motion of the mobile device 100 can include a rapid motion, such as an acceleration, a steady or increasing velocity, a tilt, a rotation, or a slow bouncing motion, such as a walking motion. In one embodiment, the motion could include periodic stopping and starting, which could be interpreted by the processor 108 as a traffic condition. Thus, the motion can be based on at least one of a velocity, acceleration, vibration, rotation, and tilt of the mobile device 100.

The motion sensor 122 transmits the sensor signal to the processor 108 (step 208). The processor 108 then generates an environmental profile of the mobile device 100 based at least in part on the sensor signal (step 210). The environmental profile can include information in addition to the sensor signal. For example, the environmental profile can include one or more of a rate of change in orientation of the mobile device 100, an environmental temperature proximate to the mobile device 100, a humidity proximate to the mobile device 100, an altitude of the mobile device 100, a user interaction with the mobile device 100, a time of day, a geographical location of the mobile device 100, a transmission status of a Bluetooth radio within the mobile device 100, and a battery charge status of the mobile device 100. The environmental profile can be optionally stored in the memory 116 of the mobile device 100 (step 212).

The processor 108 evaluates the environmental profile to determine the status of the mobile device 100 (step 214). The radio 104 can be deactivated when the environmental profile indicates that a rate of the motion of the mobile device 100 is above a predetermined threshold for a first period of time (step 216). Alternatively, the radio 104 can remain active when the environmental profile indicates that a rate of the motion of the mobile device 100 is below the predetermined threshold for a second period of time (step 218). The rate of motion can include a speed or a velocity of the mobile device 100. The first and second periods of time can be the same or different.

The predetermined threshold can be chosen based on a motion of the mobile device 100. For example, if the motion of the mobile device 100 is above the predetermined threshold, the processor 108 can determine that the mobile device 100 is likely traveling in a moving vehicle for a first period of time, the radio 104 in the mobile device 100 can be deactivated. In one mode of operation, a user can manually override the determination of the processor 108 based on the sensor signal and instruct the processor 108 to reactivate the radio 104 when the radio 104 is deactivated.

In one mode of operation, the processor 108 can periodically reactivate and deactivate the radio 104 during the first period of time to attempt to communicate with a wireless network. For example, the processor 108 can receive a signal from the motion sensor 122 that indicates the mobile device 100 is rapidly moving, such as in a moving vehicle. In response to the signal, the processor 108 can determine that a wireless network would not likely be in range of the mobile device 100 and the processor 108 may deactivate the radio 104 to conserve power. However, the mobile device 100 may be traveling in an airplane that is equipped with a wireless network. In this case, the user could instruct the processor 108 to periodically activate the radio 104 to roam for an available wireless network and remain active once connected to a wireless network.

Figure 3:
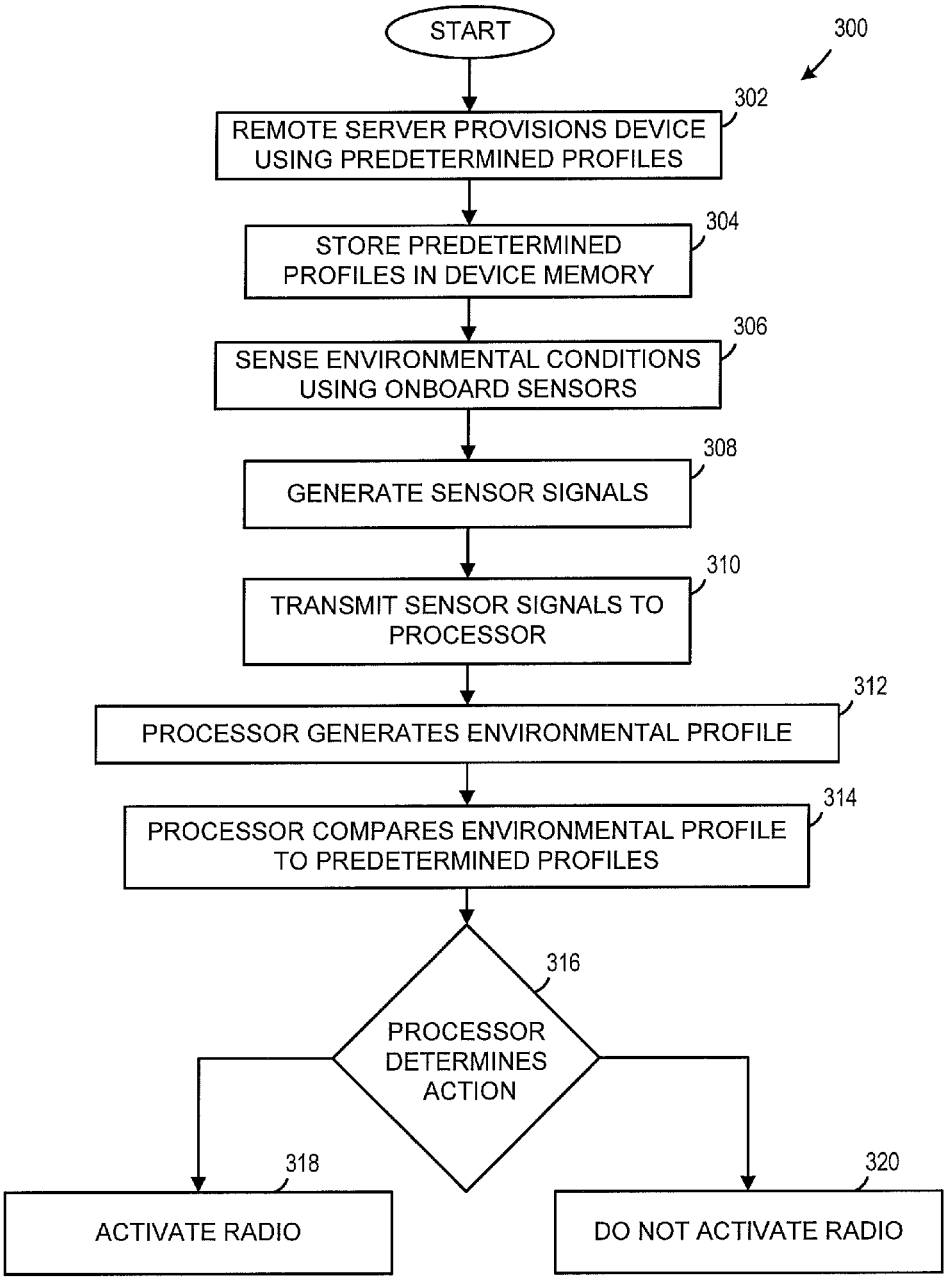
FIG. 3 is a flowchart of a method of efficient roaming for a mobile device according to another embodiment of the invention.

FIG. 3 is a flowchart 300 of a method of efficient roaming for a mobile device 100 according to another embodiment of the invention. The method includes provisioning the mobile device 100 with one or more predetermined profiles from a remote server (step 302). For example, a management server can store predetermined profiles that correspond to different environmental conditions. The profiles determine the environmental conditions in which the radio 104 in the mobile device 100 should be activated and should be deactivated to conserve power. In one embodiment, a predetermined profile can determine the conditions which would be consistent with an ability of the radio in the mobile device 100 to connect to an access point and associate with a network. For example, the radio 104 can be a wireless local area network (WLAN) radio. The radio 104 is capable of communicating with a wireless network, such as a Wi-Fi network.

The remote server transmits the predetermined profiles to the mobile device 100 when the mobile device 100 communicates with the remote server. The sever can be a mobile device management server, for example. The server can communicate with the mobile device 100 though a wired connection or wireless connection.

The mobile device 100 can store the predetermined profiles in the memory 116 of the mobile device 100 (step 304). The stored predetermined profiles can be accessed by the processor 108 of the mobile device 100.

The mobile device 100 includes a plurality of environmental sensors 122, 126, 128, and 130, as described herein with reference to FIG. 1. In operation, the sensors 122, 126, 128, and 130 can sense environmental conditions affecting the mobile device 100 (step 306). The environmental conditions can relate to motion, altitude, temperature, and/or humidity, for example.

The sensors 122, 126, 128, and 130 generate sensor signals corresponding to the environmental conditions (step 308). The generated sensor signals are transmitted to the processor 108 (step 310). The processor 108 can generate an environmental profile of the mobile device 100 based at least in part on the sensor signals (step 312). The environmental profile can include information corresponding to the sensor signals. For example, the environmental profile can include one or more of a rate of change in orientation of the mobile device 100, an environmental temperature proximate to the mobile device 100, a humidity proximate to the mobile device 100, an altitude of the mobile device 100, a user interaction with the mobile device 100, a time of day, a geographical location of the mobile device 100, a transmission status of a Bluetooth radio within the mobile device 100, and a battery charge status of the mobile device 100.

The processor 108 compares the environmental profile to the predetermined profiles to determine the status of the mobile device 100 (step 314). For example, a comparison of the environmental profile with a predetermined profile may indicate that the mobile device 100 is in a state that is consistent with a high probability that the mobile device 100 can associate to a network.

The processor 108 then decides whether or not to activate the radio 104 based on the comparison (step 316). The radio 104 can be activated when the environmental profile indicates to the processor 108 that the mobile device 100 can probably associate with a network (step 318). Alternatively, the radio 104 can remain deactivated when the environmental profile indicates to the processor 108 that the mobile device 100 likely cannot associate with a network (e.g., a network is probably not available under the present conditions) (step 320).

As previously described, the predetermined profile can be generated based on a motion of the mobile device 100. For example, if the motion of the mobile device 100 is above a certain threshold, the processor 108 can determine that the mobile device 100 is likely traveling in a moving vehicle. In this scenario, processor 108 may not activate the radio 104 in order to conserve power. In one mode of operation, a user can manually override the determination of the processor 108 and instruct the processor 108 to activate the radio 104.

Those skilled in the art will understand that the above described exemplary embodiments may be implemented in any number of manners, including, as a separate software module, as a combination of hardware and software, etc. For example, the staging applications of the mobile device and/or the staging server may be programs containing lines of code that, when compiled, may be executed on a processor.

In general, the processor 108 can include processing logic configured to carry out the functions, techniques, and processing tasks associated with the operation of the mobile device 100. Furthermore, the steps of a method or algorithm described in connection with the embodiments disclosed herein may be embodied directly in hardware, in firmware, in a software module executed by the processor, or any combination thereof. Any such software may be implemented as low level instructions (assembly code, machine code, etc.) or as higher-level interpreted or compiled software code (e.g., C, C++, Objective-C, Java, Python, etc.).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method to perform the mobile device staging described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A method comprising:

activating a radio in a mobile device by a processor of the mobile device, the radio configured to communicate with a wireless network;

provisioning the mobile device with at least one pre-determined environment profile, wherein the at least one pre-determined environment profile comprises conditions under which the radio is unable to connect with the wireless network;

sensing, by a sensor of the mobile device, an environmental condition of the mobile device to generate a sensor signal;

generating, by the processor of the mobile device, an environmental profile of the mobile device based at least on the sensor signal;

comparing, by the processor of the mobile device, the environmental profile of the mobile device with the at least one pre-determined environmental profile;

deactivating, by the processor of the mobile device, the activated radio when the comparing indicates that the environmental profile is above a threshold of the pre-determined environmental profile for a first period of time; and reactivating, by the processor of the mobile device, the deactivated radio when the comparing indicates that the environmental profile is below [a] *the* threshold of the pre-determined environmental profile for a second period of time, wherein the sensor is an altimeter and the wireless network comprises an IEEE 802.11 wireless communication system, and wherein the environmental profile [further] comprises [a rate of change in] *an* altitude of the mobile device, and wherein the [threshold] *comparing* indicates that the mobile device is within a building *based on the altitude*, whereupon the *deactivated* radio is [activated] *reactivated*.

2. The method of claim 1, [wherein the wireless network comprises an IEEE 802.11 wireless communication system, and] wherein the environmental condition includes a speed of the mobile device, wherein the [threshold] *comparing further* indicates that the mobile device is within a moving vehicle, whereupon the radio is deactivated.

3. The method of claim 2, wherein the [motion] *speed* is sensed using a motion sensor in the mobile device.

4. The method of claim 1 further comprising storing the environmental profile in a memory of the mobile device.

5. The method of claim 1, wherein the environmental condition is based on at least one of a velocity, acceleration, vibration, rotation, and tilt of the mobile device.

[6. The method of claim 1, wherein the wireless network comprises an IEEE 802.11 wireless communication system.]

7. The method of claim 1, further comprising periodically reactivating the radio during the first period of time to attempt to communicate with the wireless network.

8. The method of claim 1, wherein the first period of time is different than the second period of time.

9. The method of claim 1, further comprising deactivating the radio when the environmental profile indicates that the mobile device is traveling in a vehicle.

10. The method of claim 1, further comprising manually overriding the sensor signal to reactivate the radio when the radio is deactivated.

11. A mobile device comprising:

a sensor sensing an environmental condition of the mobile device to generate a sensor signal;

a radio configured to communicate with a wireless network; and a memory coupled to a processor and storing at least one pre-determined environmental profile, wherein the at least one pre-determined environmental profile comprises conditions under which the radio is unable to connect with the wireless network;

the processor configured to:

activate the radio in the mobile device;

generate an environmental profile of the mobile device based at least on the sensor signal;

compare the environmental profile of the mobile device with the at least one predetermined environmental profile;

de-activate the activated radio when the comparing indicates that the environmental profile is above a threshold of the pre-determined environmental profile for a first period of time; and re-activate the deactivated radio when the comparing indicates that the environmental profile is below [a] *the* threshold of the pre-determined environmental profile for a second period of time, wherein the sensor is an altimeter and the wireless network comprises an IEEE 802.11 wireless communication system, and wherein the environmental profile [further] comprises [a rate of change in] *an* altitude of the mobile device, and wherein the [threshold] *comparing* indicates that the mobile device is within a building *based on the altitude*, whereupon the *deactivated* radio is [activated] *reactivated*.

12. The mobile device of claim 11, [wherein the wireless network comprises an IEEE 802.11 wireless communication system, and] wherein the environmental condition includes a speed of the mobile device, wherein the [threshold] *comparing further* indicates that the mobile device is within a moving vehicle, whereupon the radio is deactivated.

13. The mobile device of claim 11, wherein the environmental condition is based on at least one of a velocity, acceleration, vibration, rotation, and tilt of the mobile device.

14. The mobile device of claim 11, wherein the sensor *further* comprises at *least* one of an accelerometer and a gyroscopic sensor.

15. The mobile device of claim 11, wherein the processor periodically reactivates the radio during the first period of time to attempt to communicate with a wireless network.

16. The mobile device of claim 11, wherein the first period of time is different than the second period of time.

[17. The mobile device of claim 11, wherein the wireless network comprises an IEEE 802.11 wireless communication system.]

18. The mobile device of claim 11, wherein the radio is deactivated when the environmental profile indicates that the mobile device is traveling in a vehicle.

19. The mobile device of claim 11, further comprising a user interface for communicating an instruction to the processor.

20. The mobile device of claim 19, wherein the instruction comprises manually overriding the sensor signal to reactivate the radio when the radio is deactivated.

* * * * *